(12) United States Patent
Keightley (10) Patent No.: US 6,310,644 B1
(45) Date of Patent: Oct. 30, 2001

(54) CAMERA THEODOLITE SYSTEM

(75) Inventor: John Keightley, Langley (CA)

(73) Assignee: 3DM Devices Inc., Aldergrove (CA)

( * ) Notice: Subject to any disclaimer, the term of this patent is extended or adjusted under 35 U.S.C. 154(b) by 0 days.

(21) Appl. No.: 08/832,336

(22) Filed: Mar. 26, 1997

(51) Int. Cl.$^7$ .................................................. H04N 7/18
(52) U.S. Cl. ......................... 348/159; 348/140; 348/141
(58) Field of Search ................................. 348/159, 143, 348/139, 135, 140, 141

(56) References Cited

U.S. PATENT DOCUMENTS

| | | | |
|---|---|---|---|
| 4,841,460 | * 6/1989 | Dewar et al. | 348/140 |
| 4,928,175 | * 5/1990 | Haggren | 348/139 |
| 5,285,397 | * 2/1994 | Heier et al. | 364/559 |
| 5,396,331 | * 3/1995 | Kitoh et al. | 356/376 |
| 5,440,392 | * 8/1995 | Pettersen et al. | 356/375 |
| 5,579,102 | * 11/1996 | Pratt et al. | 356/3.12 |
| 5,812,247 | * 9/1998 | Meyer | 356/3.16 |

OTHER PUBLICATIONS

Proceedings of a workshop held as part of the American Society of Photogrammetry American Congress on Surveying & Mapping 1984 Fall Convention Sep. 9–14, 1984 entitled: Close–Range Photogrammetry & Surveying: State–of–the–Art Developing the Art of Application.

* cited by examiner

Primary Examiner—Andy Rao
(74) Attorney, Agent, or Firm—Hall, Priddy, Myers & Vande Sande (57) ABSTRACT

A three-dimensional coordinate measuring system which includes first and second towers, first and second viewing devices mounted on the first and second towers, respectively, and a pair of targets mounted on each of the first and second towers a known distance apart. A tilt sensor is mounted on each of the first and second towers to measure the angle of each of the first and second towers with vertical and a host computer is coupled to each of the viewing devices and is programmed to perform photogrammetric algorithms so as to compute the coordinates of unknown points.

29 Claims, 5 Drawing Sheets

CAMERA THEODOLITE SYSTEM

FIELD

The present invention relates to an improved camera theodolite system for determining the three-dimensional coordinates of points on an object.

BACKGROUND

Figure 1:
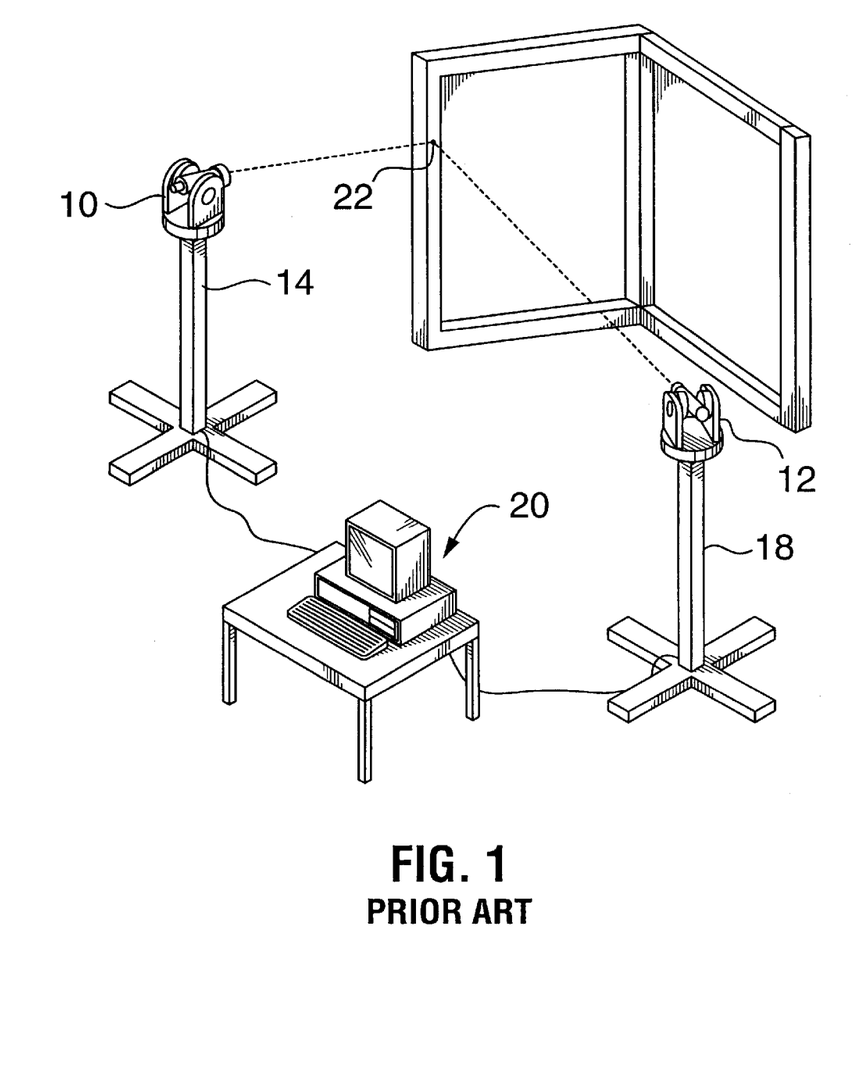
FIG. 1 is a perspective view of a prior art theodolite measuring system.

Theodolite measuring systems were originally confined to use for surveying in which two theodolites 10 and 12 mounted on stands 14 and 18, respectively, as shown in FIG. 1 were positioned a known distance apart which constituted the baseline and at known relative heights to each other. Each theodolite was then pointed at a point 22 in space of unknown coordinates and then, by using triangulation and the pointing angle of the theodolites relative to the baseline, the coordinates of the point would be determined. Commercial systems incorporated a computer 20 to measure the angles and control the pointing of the theodolites. Over the past few years such systems have begun to find industrial applications. However, all such systems require the relative positions of the theodolites to first be established by measurement and, during measurement, the object and the theodolites must be stable. Moreover, these systems can only measure one point at a time.

A laser rangefinder has been incorporated into a theodolite to make a station that can measure both the angle and distance to a target. Thus, a single station thus arranged provides all the functionality of a 3-D measuring system but still suffers from the drawbacks mentioned above.

Accordingly, it is an object of the invention to provide an improved theodolite measuring system. It is a further object of the invention to provide a theodolite measuring system that can establish coordinates in space without the need to make physical measurements to establish a baseline reference. It is a further object of the invention to provide a three dimensional coordinate measuring system that permits movement of the theodolites during measurement.

SUMMARY OF THE INVENTION

According to the invention there is provided a three-dimensional coordinate measuring system that includes a first and second towers, first and second camera assemblies mounted on first and second towers, respectively, and a pair of reference targets mounted on each of first and second towers a known distance apart. A tilt sensor is mounted on each of the first and second towers and measures the angle of each of the first and second towers with vertical. A host computer is coupled to each of camera assemblies and is programmed to perform photogrammetric algorithms so as to compute the coordinates of unknown points.

The first and second camera assemblies may each be a pair of cameras mounted on respective first and second towers in a fixed relationship to each other.

The reference targets may be illuminated from the rear. The cameras are preferably CCD cameras. Interface electronics on each tower may be coupled to respective tilt sensors and CCD cameras and to the host computer.

Advantageously the towers are mounted on casters.

Preferably, one of the cameras on each of the first and second towers may be positionable and operative to view the reference targets on the other of the first and second towers while the other camera on the one tower views an object whose coordinates are to be determined.

Object points may be measured using a hand held probe having a plurality of targets spaced in a geometric progression from a tip thereof.

The reference targets may be pulsed light emitting diodes emitting in the near infra red and said CCD cameras have near infra red optical bandpass filters thereon.

Advantageously the towers may be height adjustable.

The camera assemblies may also be a single camera and a beamsplitter. Such an arrangement avoids the need to introduce the inaccuracies from two cameras as opposed to those from just one for each tower.

In another aspect of the invention there is provided a method of measuring the three dimensional coordinates of an object in space which involves positioning two towers each having a camera assembly and a pair of reference targets, spaced a known distance apart, such that the camera assembly on each tower views the reference targets on another of said towers and the object. At least a portion of the image received by the camera assembly is digitized, transferred to a host computer which performs a triangulation calculation on the two viewing devices to determine the three dimensional coordinates of the object. Preferably the camera assembly on each tower is a pair of CCD cameras.

Advantageously, only the pixels from the CCD cameras having an amplitude in excess of a threshold above a 'black level' are transmitted to the host computer.

The cameras may be calibrated by measuring distortions in the image forming process and then constructing an analytical model to subsequently correct the images acquired in the future.

Field calibrating the cameras may be employed by using a redundant set of data to determine camera parameters prior to determining three dimensional coordinates of object.

BRIEF DESCRIPTION WITH REFERENCE TO THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 2:
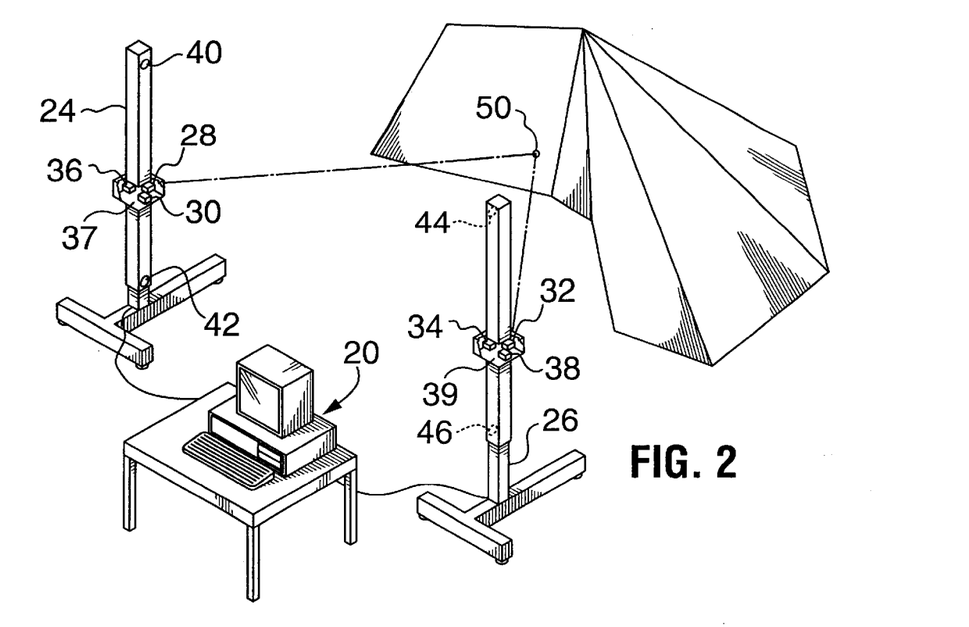
FIG. 2 is a perspective view of the present theodolite coordinate measuring system.
Figure 3:
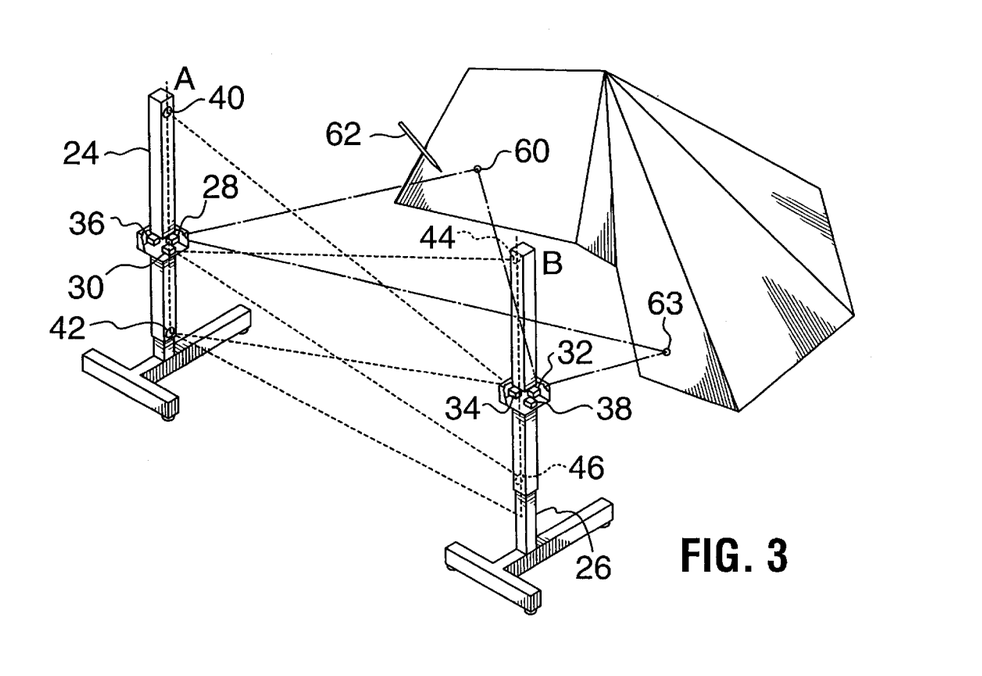
FIG. 3 is a ray diagram showing the various rays that are involved in the present measuring system.
Figure 4:
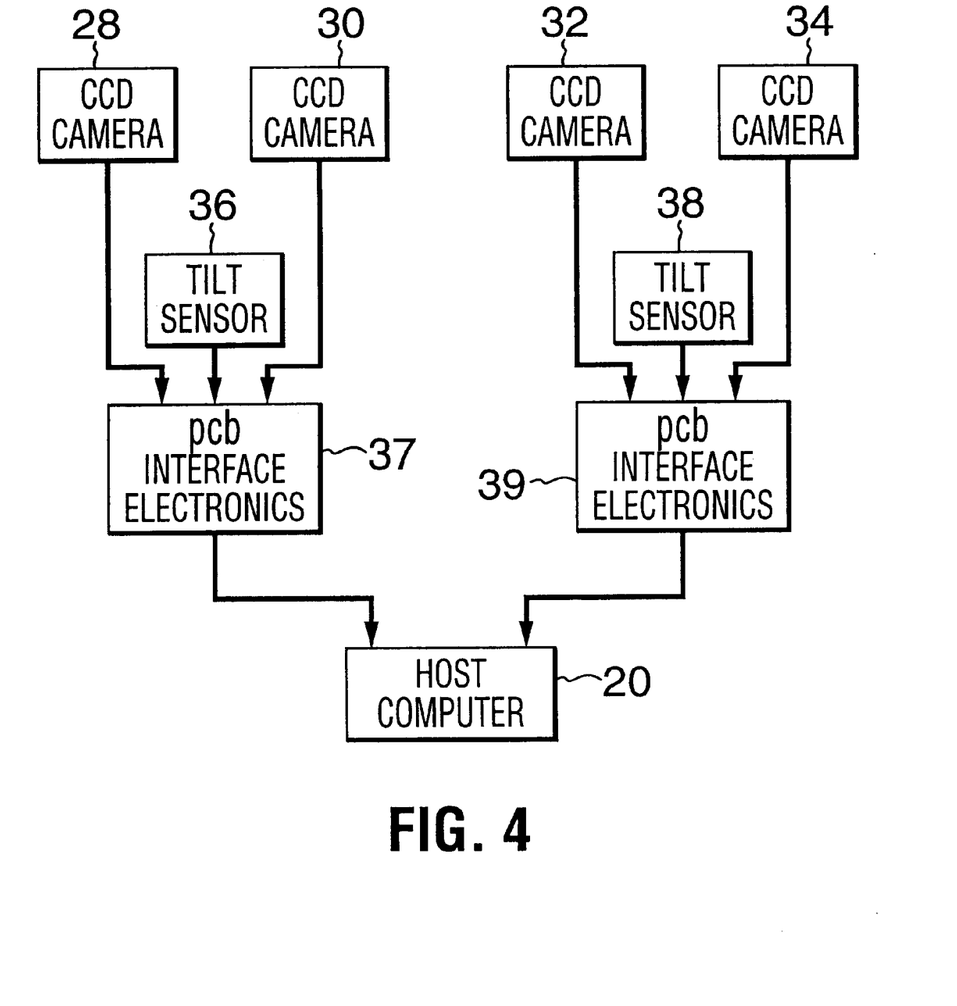
FIG. 4 is a block level circuit diagram showing the arrangement of the cameras, electronics and host computer.

Referring to FIGS. 2, 3 and 4, tower 24 has mounted thereon a pair of CCD cameras 28 and 30 in fixed relationship to each other. Tower 26 also has a pair of CCD cameras 32 and 34 mounted in fixed relationship to each other. Camera 30 on tower 24 views tower 26 while camera 34 views tower 24. Cameras 28 and 32 view the object 50 whose position coordinates are to be measured. The cameras on each tower 24 and 26 are connected to respective printed circuit boards 37 and 39 located on each of towers 24 and 26, respectively. The towers 24 and 26 are supported on a base with casters and have a telescoping height adjustment.

Tower 24 has reference targets 40 and 42 affixed thereto at a known distance apart while tower 26 has reference targets 44 and 46 affixed thereto also at a known distance apart. The reference targets 40 and 42 and 44 and 46 are diffuse target discs illuminated from the rear with pulsed LED's emitting in the near infrared. The pulsing of these LEDs is controlled by the electronics associated with the cameras. The cameras 28 and 30 and 32 and 34 are fitted with near infrared optical bandpass filters to match the LED wavelength. Each of towers 24 and 26 has a two axis tilt sensor 36 and 38, respectively, which provides an accurate measurement of the tower angle relative to the vertical. The tilt sensors used are electronic ones manufactured by The Fredericks Company sold as Model-0729-1703-99. The printed circuit board electronics on each of towers 24 and 26 interfaces to the tilt sensors 36 and 38, respectively, and reports the vertical pitch and yaw angle back to the host computer 20. The relative orientation of the cameras 28 and 30 and 32 and 34 and the distances between the targets 40 and 42 and 44 and 46 are determined during a factory calibration process. A computer 20 is coupled to printed circuit boards 37 and 39 electronics on towers 24 and 26, respectively. The printed circuit board electronics on each of towers 24 and 26 digitize an area of interest for each of cameras 28 and 30 and 32 and 34 and transmit this information back to the host computer 20.

As seen in FIG. 3, the measurements that are taken and the distances and locations established by the host computer 20 are the locations of targets 40 and 42 relative to camera 34 and the locations of targets 44 and 46 relative to camera 30. The latter locations can be computed with sub-millimetre accuracy since multiple images can be taken and averaged. The process is continuous and automatic to both refine the position and/or indicate to the operator that a change has taken place.

The target location information is then used in conjunction with the tilt sensor readings and factory calibrated location of the camera and targets on each tower to calculate the horizontal baseline distance between the towers, the vertical orientation of each tower, and hence the position and pointing angle of each measurement camera 28 and 30 and 32 and 34. The location of unknown points 60 and 63 can then be computed using this information and standard photogrammetry processing of the images recorded by the cameras 28 and 30 and 32 and 34.

Photogrammetry, which is the science of taking 3 dimensional (X,Y,Z) coordinate measurements from photographs, takes at least 2 photographs of an object and triangulates the resulting two-dimensional image measurements to produce the X,Y,Z coordinates of targeted points on the object. The multiple photographs can be taken by two or more cameras or, alternatively, by a single camera in two or more positions. Conventional photogrammetry employs expensive, highly accurate "metric" cameras that provide essentially distortion free images of the target scene. In order to extend this technique to replace the metric cameras by lower cost cameras and CCD video cameras, suitable computer processing and calibration techniques had to be developed. These processing and calibration techniques involve a determination of all the inaccuracies in the image forming process for each camera, and then construction of an analytical model of these to correct the images recorded in the field.

In calibrating the cameras, distortions in the image forming process are measured and then used to construct an analytical model that is subsequently used to correct the images acquired in the future. There are various techniques for camera calibration some of which are described in the following publications:

(1) Sheng-Wen Shih et al, Accurate Linear Technique for Camera Calibration Considering Lens Distortion by Solving an Eigenvalue Problem, Optical Engineering, January 1993, Vol. 32, No.1, p. 138.

(2) Tsai R. Y., A Versatile Camera Calibration Technique for High Accuracy 3-D Machine Vision Metrology Using Off-the-Shelf TV cameras and Lenses, IEEE J. Robot Automation RA-3(4), 323–344 (1987).

(3) Cosandier D. & Chapman M. A., High Precision Target Location for Industrial Metrology, Videometrics, SPIE O/E Technology, Boston, November 1992.

Although the various techniques differ in the form of analytical model and calibration object, all of them use essentially the following variables:

(1) Camera position
(2) Camera orientation
(3) Lens focal length
(4) Lens radial distortion—multiple parameters
(5) CCD array pixel size (x,y)
(6) Optical axis location The analytical model is quantified by taking multiple measurements of known target points—the calibration object—and then calculating the values of the variables using a least squares fitting technique.

The calibration object is ideally a collection of targets (60 or more) randomly distributed throughout the camera's 3-D field of view. In practice, this can consist of targets fixed on a rigid frame, targets on a flat surface that is moved in a controlled fashion, or a single target moved in 3-D space. In all instances, the X,Y,Z location of these targets must be accurately known.

Camera Calibration

The present calibration technique is based a non-linear bundle adjustment technique described by Cosandier, supra. The term "bundle adjustment" refers to the technique of building an analytical model of the camera and lens and analyzing the effect of multiple rays of light (bundles) passing through the image forming system. In the classical implementation, a single calibrated camera is used to take multiple images from multiple locations of a relatively large number of fixed targets. The constant factors are the camera internal parameters such as lens focus, pixel sizes, optical axis, and lens distortions and the relative position of all of the targets. The unknowns are the external parameters such as position and orientation of the camera for each set of images. The large number of target points provides a redundant set of data from which the relatively few unknowns can be calculated with high precision using iterative techniques. This is accomplished by feeding all the data sets into the analytical model and then varying the unknown variables to minimize the residuals calculated for each of the fixed target locations. The result is a non-dimensional solution for all the model parameters that can be quantified with a single known distance in the field of view.

Thus, "bundle adjustment' is a generic term for any technique that utilizes a redundant set of data to determine camera parameters. The technique can be applied at the camera calibration stage, and also in the field to perform 'self-calibration'.

Self-calibration is useful when time is not a factor and multiple images can be taken, as is the case in many industrial measurements such as inspection of tooling, measurement during fabrication of large structures, etc. The result is very accurate measurements that are not dependent on a previous camera calibration which may have been done at different camera or lens settings.

Target Acquisition

Target acquisition refers to the process of acquiring the image of a target in digital form and processing this data to determine the target center to sub-pixel resolution. This process is fundamental to the camera calibration and measurement of unknown signals.

The targets employed are circular discs, either retro-reflective types illuminated by high intensity strobe lights or self-luminous types illuminated by high intensity internal LED's. In either case, the target appears as a rotated ellipse covering multiple pixels in the image plane of the camera. The first task of the target acquisition software is the rough location of this ellipse within the complete image, and then determination of the centroid of this ellipse to sub-pixel resolution.

The rough location of each target is established by setting upper and lower thresholds for the pixel amplitude and target size and then examining each pixel amplitude in turn throughout the complete image to locate one or more target areas. This can be performed in software on the entire digitized image, or more efficiently in hardware using a comparator operating on the input analog video signal to locate these areas in each video line and trigger digitization of just these areas of interest.

The precise location of the centroid of the target is determined in one of two manners depending on the number of pixels present in the image of the target. Small images having less than approximately 16 pixels (4×4) are best analyzed using a simple pixel moment calculation in separate x and y calculations as follows:

$$X_{centroid} = \Sigma(P_i X_i)/\Sigma P_i \text{ and similarly for } Y_{centroid}$$

where $P_i$ is the pixel amplitude and $X_i$ is the distance of the $i^{th}$ pixel from the y-axis for all pixels within a lighted envelope. Similarly the value of $Y_{centroid} = \Sigma(P_i Y_i)/\Sigma P_i$ where $Y_i$ is the distance from the x-axis to the $i^{th}$ pixel for all of the pixels in the lighted envelope.

Larger images are analyzed to better accuracy using techniques of Cosandier, supra.—the image of the rotated ellipse is processed by an edge detection algorithm in the x and y directions. This resulting edge locus is then fitted to the generalized rotated ellipse equation using a least squares technique and the ellipse centroid thus determined to sub-pixel resolution.

Area of Interest Digitization

The gray scale image as viewed by the CCD array is typically almost entirely black with several small bright regions corresponding to the targets. The gray scale image data required by the target acquisition routines is contained within these bright regions, all of the other 'black field' data is not required.

In the present close range photogrammetry system the camera image is acquired in analog form and digitized at the camera head. An analog comparator set to a threshold value above the typical 'black level' controls how much digitized data is actually stored and transmitted. The location of this digitized data in line number, start and end pixel format is recorded and this 'index table' is transmitted with the digitized data to the host computer. This method provides the maximum noise immunity by digitizing at the camera head which minimizes the transmission data rate and processing burden on the host computer.

However, one could also acquire and process the camera image in other ways. For example one could acquire the image in analog form and transmit this via coaxial cable to a frame grabber located in the host computer. A frame grabber is simply an analog-to-digital converter followed by a buffer memory array which holds image pixels. For maximum accuracy, the pixel clock must be transmitted on a second cable, and video line timing on a third. The host computer controls digitization of the complete image frame and subsequently processes all of this data to locate the target(s).

Alternatively, one could acquire the image in analog form, digitize at the camera head and then transmit this data to the host computer. This provides maximum noise immunity and throughput in the digitization process but requires a high speed digital data link to transmit the data to the host PC which must then process this data for the entire image.

Determination of Unknown Point X,Y,Z Coordinates

The final element in the photogrammetry process is the determination of the coordinates of an unknown point which is dependent upon the system configuration.

If there is high degree of redundancy in the data such as multiple images or a sufficient number of known reference targets in the field of view of each camera, then the bundle adjustment technique can be applied and the unknown X, Y,Z coordinates are just more variables added to the existing camera parameters which are then all solved for in the iterative solution.

In a real time situation where only one set of images is available from multiple cameras, simple triangulation calculations based on the camera calibration, known camera positions and orientations are usually employed. The bundle adjustment technique may be used if there are sufficient known reference targets and the cameras are pre-calibrated.

The present system which uses two reference cameras to determine the camera tower positions and orientation and two calibrated viewing cameras rigidly attached to these, depends on a precise factory calibration of the camera towers described below. Data reduction in the field is done by first establishing a vertical frame of reference using simple triangulation on the two reference cameras, the reference targets on each tower and their orientation to the vertical. The X,Y,Z coordinates of the unknown points are then established by simple triangulation on the two viewing cameras.

The frame of reference can be fixed by measuring two points such as 60 and 63 which uniquely define a vertical plane passing through them. By arbitrarily setting one of the points as the origin and defining a conventional right hand Cartesian coordinate system about this point, a complete frame of reference can be established. The camera towers 24 and 26 may then be repositioned as desired to view other parts of the object and the positions of points 60 and 63 re-acquired to place new measurements into the original frame of reference. The only restriction put on points 60 and 63 is that they be immobile, viewable by both camera towers 24 and 26, and preferably switched on/off by the host computer 20 to facilitate acquisition and identification.

Factory Calibration

Each tower is assembled and then calibrated at the factory as follows:

Camera Calibration

Each camera is focused and the lens locked. The camera/lens assembly is then calibrated using a known 3-D arrangement of targets and the bundle adjustment technique described by Cosandier, supra.

Camera & Reference Target Locations

The distance between the centers of the two tower reference targets and the center of each camera CCD array is measured using a coordinate measuring machine and sighting telescope.

Tilt Sensor Zero

The X and Z axes are set in turn. A theodolite is set approximately 3 meters away from the tower and properly leveled. The tower is set such that the reference targets are facing the theodolite—ie., the theodolite is in the XY plane. The tower is then leveled such that a line passing through the center of the face of the reference targets is vertical as determined by use of the theodolite. The X tilt sensor is then mechanically zeroed and then electronically trimmed to read zero. The process is repeated for the z axis using a line scribed on the side of the targets for referencing the face of each.

Camera Orientation with Respect to Horizontal (Pitch and Roll Angles)

The camera tower is set vertical by reference to the tilt sensor. A pair of targets are set on a horizontal plane at a working distance from the tower. Their horizontal plane is set to the same height as that of the camera by use of a theodolite. The camera image of these targets is processed as follows:

(1) The horizontal distance from the camera to the targets is determined from the camera calibration and the known distance between the targets.

(2) The vertical pitch angle of the camera is determined from the vertical displacement of the targets from the center of the CCD and the horizontal distance calculated in the step above.

(3) The lateral roll angle of the camera is determined by the angular displacement of the camera image relative to the horizontal targets.

This process is repeated for the other cameras.

Camera Orientation with Respect to Each Other (Horizontal Yaw)

The camera tower is set vertical by reference to the tilt sensors. The two targets on a horizontal plane are set in the field of view of one camera. A 90° pentaprism is attached to the side of the tower such that the second camera can also view both targets. The pentaprism is rotated to align the targets onto the horizontal axis of both cameras using the calibration data acquired in the previous calibration step. The horizontal offset introduced by the pentaprism is a known value as determined by physical measurement of the pentaprism and mounting arrangement. The horizontal angle between the camera axes can now be determined by comparison of the images on each camera. The known distance between the targets permits determination of the horizontal distance. Any displacement of the targets from the optical axis that is not due to the 90° pentaprism is attributable to a non 90° angle between the two camera optical axes. The measurement can be verified by placing the horizontal targets at different distances from the tower. Note that his technique is applicable for a camera included angles less than 90° by use of an appropriate pentaprism—e.g 70° for 70° included angle. This then concludes the factory calibration.

Field Verification of Calibration

A plumb line with two targets spaced a working distance apart is placed in the field of view of the tower for each camera in turn. The processed image should yield two target locations in true vertical alignment.

Camera Included Angle

An appropriate pentaprism with magnetic attachment for convenience can be supplied to users. The horizontal included angle can be checked by placing a single target a measured distance of say 2 meters from the tower (An accuracy of ±100 mm is adequate). The horizontal location of the target should be determined to be the same for each camera after correction for the pentaprism introduced offset.

Handheld Probe

Figure 5:
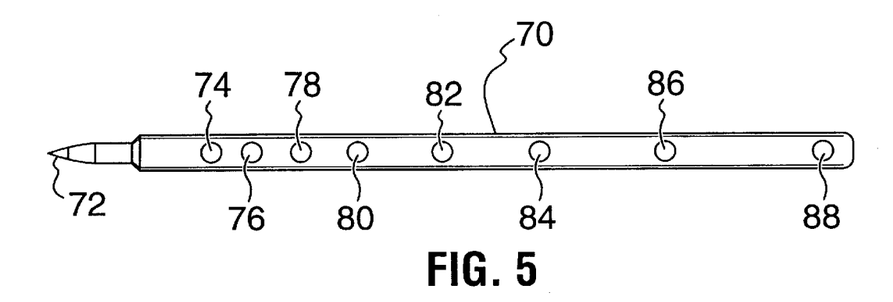
FIG. 5 is a front elevation view of the object target used to locate positions to be measured.

An additional feature of the proposed system is a handheld probe 70 as seen in FIG. 5 fitted with a multitude of targets 74, 76, 78, 80, 82, 84, 86, and 88 that are used for measurement of unknown points which are pointed to by the tip 72 of the probe 70. Existing photogrammetry systems utilize a handheld probe with four retro-reflective targets. Each of these targets must be "seen" by the cameras in order to recover the location of the tip. Probe 70 has multiple targets 74, 76, 78, 80, 82, 84, 86, and 88 arranged in a line and with a spacing between the targets 74, 76, 78, 80, 82, 84, 86, and 88 arranged in geometrical progression. With such a spacing it is not necessary to recover the position of all of the targets. The spacing between three targets is sufficient to locate the probe tip 72 although more targets provide a higher confidence in the tip location.

In use, the location of three or more of the targets are passed through a line fitting routine which uses the known geometric relationship between the targets to determine which targets have been recovered. This probe design is thus capable of providing useful 3-D locations in cramped work areas where one or more of the targets may be obscured.

Figure 6:
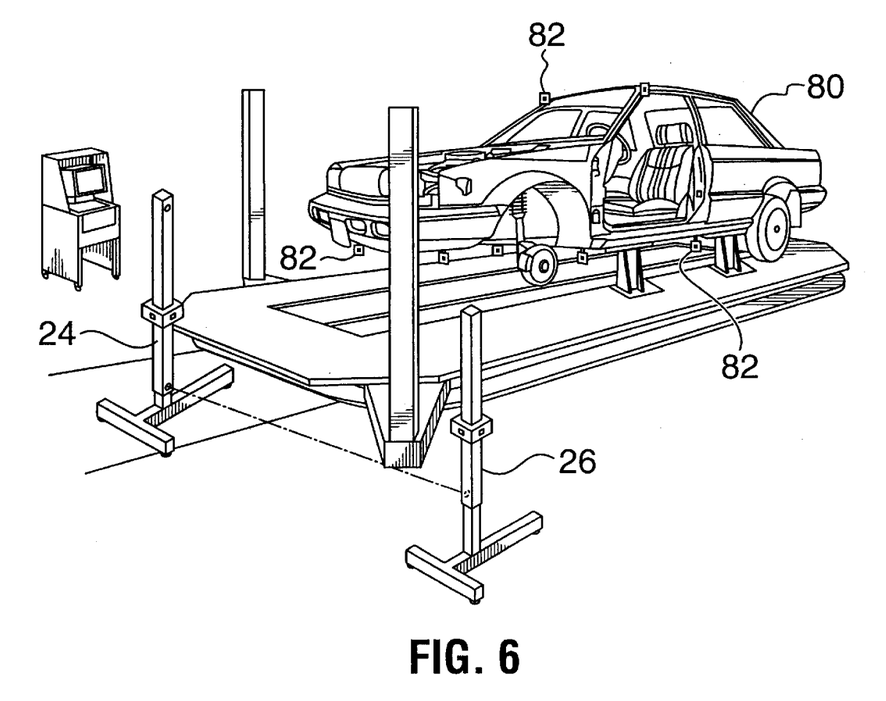
FIG. 6 is a perspective view of the present system used to measure various locations on an automobile.

Referring to FIG. 6, application of the system to the measurement of vehicle frames for post-collision repair involves fixing two or more targets 82 to the vehicle 80 or floor and then re-positioning the camera towers 24 and 26 as required to make measurements at all points around the vehicle 80. More towers may be added to avoid having to re-position towers. This system provides a flexible measuring method with no requirement for pre-calibrated alignment targets or frame.

Single Camera Version

Figure 7:
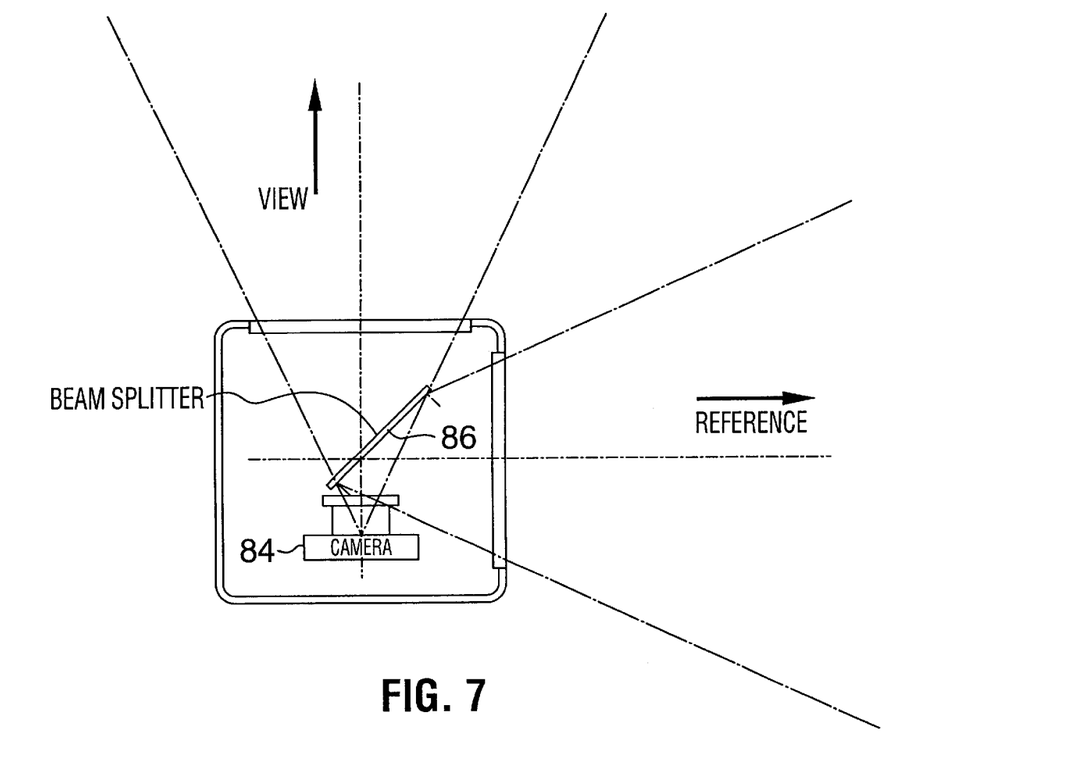
FIG. 7 is plan view of a single theodolite system employing a beam splitter.

Referring to FIG. 7, a single camera version of the tower system can be configured using a single camera and beamsplitter to replace the two cameras. In this case the camera axis is aligned at 45° to a beamsplitter 86. The beamsplitter 86 has 50% transmission and 50% reflectance at the working wavelength and has an anti-reflection coating on the reverse side to minimize any ghost images. This arrangement reduces the complexity of the system and provides greater accuracy and stability over time since there is only one set of camera components.

Calibration of the system of FIG. 7 is accomplished in a similar manner to the two camera version. Two camera calibrations are performed, one through the beamsplitter 86 and one for the reflected image, unless the beamsplitter 86 is of high optical quality (parallel and flat surfaces) and relatively thin.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A three-dimensional coordinate measuring system, comprising:

a) first and second towers;

b) first and second camera assemblies mounted on said first and second towers, respectively;

c) a first pair of reference targets mounted to said first tower such that said reference targets of said first pair are a known distance apart, and a second pair of reference targets mounted to said second tower such that said reference targets of said second pair are a known distance apart;

d) a tilt sensor mounted on each of said first and second towers operative to measure the angle of each of said first and second towers with vertical; and e) a host computer coupled to each of said camera assemblies and to said tilt sensors operative to receive automatically measurements from selected targets, from each pair of said reference targets and a tower angle to vertical measurements from each of said tilt sensors, said host computer being programmed to perform photogrammetric algorithms so as to compute the coordinates of unknown points.

2. A system according to claim 1, wherein said first and second camera assemblies are each a pair of cameras mounted on respective first and second towers in a fixed relationship to each other.

3. A system according to claim 1, wherein said reference targets are illuminated circular discs.

4. A system according to claim 2, wherein said cameras are CCD cameras and including interface electronics on each tower coupled to respective tilt sensors and CCD cameras and coupled to said host computer.

5. A system according to claim 1, wherein said towers are mounted on casters.

6. A system according to claim 4, wherein one of said cameras on each of said first and second towers is positionable and operative to view the reference targets on the other of said first and second towers while the other camera on said one tower views an object whose coordinates are to be determined.

7. A system according to claim 1, wherein object points are measured using a hand held probe having a plurality of targets spaced along a straight line in a geometric progression from a tip of said hand held probe.

8. A system according to claim 4, wherein said reference targets are pulsed light emitting diodes emitting in the near infra red and said CCD cameras have near infra red optical bandpass filters thereon.

9. A system according to claim 1, wherein said towers are height adjustable.

10. A system according to claim 1, wherein said camera assemblies are each a single camera and a beamsplitter.

11. A three-dimensional coordinate measuring system, comprising:

a) first and second towers;

b) a pair of CCD cameras mounted on said first and second towers, respectively, in a fixed relationship with each other;

c) a first pair of reference targets mounted to said first tower such that said reference targets of said first pair are a known distance apart, a second pair of reference targets mounted to said second tower such that said reference targets of said second pair are a known distance apart and a pair of said reference targets on one of said first and second towers is visible to one of the said pair of CCD cameras on the other of said first and second towers;

d) a tilt sensor mounted on each of said first and second towers operative to measure the angle of each of said first and second towers with respect to vertical; and e) an interface circuit mounted on each of said first and second towers, each interface circuit coupled to the CCD cameras and the tilt sensor mounted on an associated one of said first and second towers;

f) a host computer coupled to said interface circuits, said host computer operative to receive automatically measurements from selected targets, from each pair of said reference targets and a tower angle to vertical measurements from each of said tilt sensors, said host computer being programmed to perform photogrammetric algorithms so as to compute the coordinates of unknown points.

12. A system according to claim 11, wherein said reference targets are illuminated from the rear periodically by light emitting diodes emitting light in the near infra red and said cameras have near infra red optical bandpass filters.

13. A system according to claim 11, wherein said towers are movable and height adjustable.

14. A system according to claim 11, including an elongated hand held probe having targets spaced along a line in a geometric progression from a tip thereof.

15. A system according to claim 11, wherein said cameras are calibrated using as variables camera position, camera orientation, lens focal length, lens radial distortion, CCD array pixel size, and optical axis location.

16. A three-dimensional coordinate measuring system, comprising:

a) first and second towers;

b) a CCD camera and a beam splitter mounted on each of said first and second towers, respectively, in a fixed relationship with each other;

c) a first pair of reference targets mounted to said first tower such that said reference targets of said first pair are a known distance apart, a second pair of reference targets mounted to said second tower such that said reference targets of said second pair are a known distance apart and a pair of reference targets on one of said first and second towers is visible to said CCD camera on the other of said first and second towers;

d) a tilt sensor mounted on each of said first and second towers operable to measure the angle of each of said first and second towers with vertical; and e) an interface circuit mounted on each of said first and second towers, each interface circuit coupled to a CCD camera and a tilt sensor mounted on an associated one of said first and second towers;

f) a host computer coupled to said interface circuits, said host computer programmed to perform photogrammetric algorithms so as to compute the coordinates of unknown points.

17. A system according to claim 16, wherein said reference targets are illuminated from the rear periodically by light emitting diodes emitting light in the near infra red and said cameras have near infra red optical bandpass filters.

18. A system according to claim 16, wherein said towers are movable and height adjustable.

19. A system according to claim 16, including an elongated hand held probe having targets spaced along a line in a geometric progression from a tip thereof.

20. A system according to claim 16, wherein said cameras are calibrated using as variables camera position, camera orientation, lens focal length, lens radial distortion, CCD array pixel size, and optical axis location.

21. A method of measuring the three-dimensional coordinates of an object in space, comprising:

a) positioning a first and second towers, each of said towers having a camera assembly, wherein a first pair of reference targets are mounted to said first tower such that said targets of said first pair are a known distance apart and a second pair of reference targets are mounted to said second tower such that said targets of said second pair are a known distance apart such that said camera assembly on each of said towers views the reference targets on the other of said towers and the object;

b) digitizing the image received on each camera assembly;

c) transferring at least a portion of said image to a host computer; and d) performing a triangulation calculation on the two camera assemblies to determine the three-dimensional coordinates of the object.

22. A method according to claim 21, wherein said camera assembly on each of said towers is a pair of CCD cameras.

23. A method according to claim 21, wherein only pixels from said CCD cameras having an amplitude in excess of a threshold above a 'black level' are transmitted to the host computer.

24. A method according to claim 21, wherein each said camera assembly is calibrated by measuring distortions in an image forming process and then constructing an analytical model and using that model to correct images subsequently taken by each said camera assembly.

25. A method according to claim 21, including establishing a frame of reference by measuring two immobile points and arbitrarily selecting one of said two points as an origin of a right hand Cartesian coordinate system.

26. A method according to claim 21, including calibrating each said camera assembly using a redundant set of data to determine camera parameters prior to determining three-dimensional coordinates of said object.

27. A system according to claim 1, wherein said host computer continuously computes the positional relationship between said first camera assembly and said second camera assembly.

28. A method according to claim 22, further including the step of automatically and continuously computes the positional relationship between said two towers.

29. A method according to claim 22, including the calculation of the centroid of said object in space to subpixel resolution.

* * * * *